US008887042B2

(12) United States Patent
Song

(10) Patent No.: US 8,887,042 B2
(45) Date of Patent: Nov. 11, 2014

(54) ELECTRONIC MULTIMEDIA PUBLISHING SYSTEMS AND METHODS

(76) Inventor: Young-Joo Song, Pyeongtaek-si (KR)

( * ) Notice: Subject to any disclaimer, the term of this patent is extended or adjusted under 35 U.S.C. 154(b) by 5 days.

(21) Appl. No.: 13/698,885

(22) PCT Filed: Jun. 1, 2011

(86) PCT No.: PCT/IB2011/001202
§ 371 (c)(1),
(2), (4) Date: Apr. 4, 2013

(87) PCT Pub. No.: WO2011/151709
PCT Pub. Date: Dec. 8, 2011

(65) Prior Publication Data
US 2013/0191708 A1     Jul. 25, 2013

Related U.S. Application Data

(60) Provisional application No. 61/350,276, filed on Jun. 1, 2010.

(51) Int. Cl.
| G06F 17/00 | (2006.01) |
| G06Q 10/10 | (2012.01) |
| H04L 29/08 | (2006.01) |
| G06Q 30/06 | (2012.01) |
| G06F 17/24 | (2006.01) |

(52) U.S. Cl.
CPC ............... *G06F 17/24* (2013.01); *G06Q 10/10* (2013.01); *H04L 67/20* (2013.01); *G06Q 30/06* (2013.01); *H04L 67/22* (2013.01)
USPC .......................................... 715/255; 715/202

(58) Field of Classification Search
USPC ................................................. 715/202, 255
See application file for complete search history.

(56) References Cited

U.S. PATENT DOCUMENTS

| 8,112,029 | B1 * | 2/2012 | Marroquin et al. ............ 434/317 |
| 8,239,265 | B2 * | 8/2012 | Patwa et al. ................. 705/14.49 |
| 8,473,865 | B2 * | 6/2013 | Huang et al. .................... 715/810 |

(Continued)

FOREIGN PATENT DOCUMENTS

| KR | 20060030876 | 4/2006 |
| KR | 20080073163 | 8/2008 |
| WO | WO2005101232 | 10/2005 |

OTHER PUBLICATIONS

Hameed et al., An E-book personalization architecture with digital rights and encryption procedures, IEEE 2010, pp. 1222-1227.*

(Continued)

*Primary Examiner* — Cong-Lac Huynh
(74) *Attorney, Agent, or Firm* — Harness, Dickey & Pierce, P.L.C.

(57) ABSTRACT

An electronic multimedia publishing system includes an authoring system, a service provider system, and a remote computing device. The authoring system creates an enhanced electronic book comprising text, multimedia content, and interactive services. The service provider system allows execution of the interactive services, adapts the enhanced electronic book based on usage of the enhanced electronic book by a user, and interfaces the enhanced electronic book to a plurality of additional services. The remote computing device renders the enhanced electronic book to the user and manages interactions between the user, the enhanced electronic book, and the service provider system using the interactive services.

54 Claims, 10 Drawing Sheets

(56) References Cited

U.S. PATENT DOCUMENTS

| | | | |
|---|---|---|---|
| 8,769,038 B2 * | 7/2014 | Montoya | 709/217 |
| 2001/0053274 A1 * | 12/2001 | Roelofs et al. | 386/46 |
| 2002/0091793 A1 | 7/2002 | Sagie | |
| 2003/0055770 A1 * | 3/2003 | RuDusky | 705/37 |
| 2004/0205645 A1 * | 10/2004 | Hoffman | 715/530 |
| 2005/0214730 A1 * | 9/2005 | Rines | 434/318 |
| 2005/0251732 A1 * | 11/2005 | Lamkin et al. | 715/500.1 |
| 2007/0254634 A1 * | 11/2007 | Costa-Requena et al. | 455/412.1 |
| 2008/0005301 A1 * | 1/2008 | Li et al. | 709/223 |
| 2008/0178074 A1 * | 7/2008 | Stallings | 715/249 |
| 2008/0263438 A1 | 10/2008 | Dias | |
| 2008/0319871 A1 * | 12/2008 | Thomas et al. | 705/26 |
| 2009/0202226 A1 | 8/2009 | McKay | |
| 2009/0241015 A1 * | 9/2009 | Bender et al. | 715/202 |
| 2010/0050272 A1 * | 2/2010 | Tadayon et al. | 726/28 |
| 2011/0200980 A1 * | 8/2011 | Takahashi et al. | 434/365 |
| 2011/0276863 A1 * | 11/2011 | Bhise et al. | 715/201 |
| 2012/0096087 A1 * | 4/2012 | Curcelli | 709/204 |
| 2012/0127976 A1 * | 5/2012 | Lin et al. | 370/338 |
| 2012/0137246 A1 * | 5/2012 | Pyo | 715/776 |
| 2013/0054399 A1 * | 2/2013 | Ben-Yaacov et al. | 705/26.1 |
| 2013/0124730 A1 * | 5/2013 | Buerk et al. | 709/225 |
| 2013/0143522 A1 * | 6/2013 | Rege et al. | 455/405 |
| 2013/0185805 A1 * | 7/2013 | Raley et al. | 726/27 |
| 2013/0298067 A1 * | 11/2013 | Parker et al. | 715/776 |

OTHER PUBLICATIONS

Amazon.com, Kindle Previewer User Guide, version 2.92, Google 2013, pp. 1-32.*

International Search Report and Written Opinion for PCT/IB2011/001202, Feb. 24, 2012, 4 pages.

Teller, David, "Openberg e-book reader, design and rationale," <http://www.univ-orleans.fr/lifo/Members/David.Teller/publications/openberg.pdf> University of Sussex, UK; Mar. 31, 2006; 64 Pages.

K-H, Lee, et al., "Standardization aspects of eBook content formats," Computer Standards and Interfaces, Elsevier Seqoia, Lausanne, CH, vol. 24 No. 3; Jul. 1, 2002; 14 Pages (pp. 227-239).

Noring, Jon, "OEBPS: The Universal Consumer eBook Format?", OpenReader <http://www.cs.unibo.it/_cianca/wwwpages/dd/noring.pdf> May 20, 2003; 8 Pages.

Supplemental European Search report dated Oct. 9, 2013 for Application No. EP 11 78 9 325.5; 7 Pages.

* cited by examiner ns and methods.

ELECTRONIC MULTIMEDIA PUBLISHING SYSTEMS AND METHODS

CROSS-REFERENCE TO RELATED APPLICATIONS

This application is a National Phase Entry of International Application No. PCT/IB2011/001202, filed on Jun. 1, 2011, which claims priority to U.S. Patent Application Ser. No. 61/350,276, filed on Jun. 1, 2010, both of which are incorporated by reference herein.

FIELD

The present disclosure relates to electronic multimedia publishing systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Reading books, magazines, newspapers, etc. is an activity enjoyed by many people around the world. Electronic books (E-books) is a generic term used for digital versions of printed books, magazine, newspaper, etc. E-Books are typically distributed through the Internet. E-books are delivered in the form of files than can be read on specific hardware devices such as eReaders as well as on general-purpose hardware devices such as tablets, smartphones, and personal computers (PCs). Due to proliferation of mobile digital devices in recent years, E-books are taking over printed-book culture, and the way in which people consume books, magazine, newspaper, etc. is rapidly changing.

SUMMARY

An electronic multimedia publishing system includes an authoring system, a service provider system, and a remote computing device. The authoring system creates an enhanced electronic book comprising text, multimedia content, and interactive services. The service provider system allows execution of the interactive services, adapts the enhanced electronic book based on usage of the enhanced electronic book by a user, and interfaces the enhanced electronic book to a plurality of additional services. The remote computing device renders the enhanced electronic book to the user and manages interactions between the user, the enhanced electronic book, and the service provider system using the interactive services.

The enhanced electronic book uses a Rich-Book format that is advantageous relative to the formats used by conventional e-books. Following are some of the advantages of the Rich-Book format disclosed by the present disclosure over the formats of the conventional e-books. While the formats of the conventional e-books are designed and utilized for text-oriented e-book content, the Rich-Book format integrates advanced form of media data in addition to text. Using the Rich-Book format, users can interact with the media in various ways depending on the content of the enhanced electronic book. The Rich-Book format allows third-party applications to be associated with the content. The Rich-Book format provides customized, personalized, and dynamic content depending on user environment and interaction. The Rich-Book format allows easy updating of the content using user-generated data. The Rich-Book format allows delivery and update of the content via various networks. None of these and other benefits described herein are provided by the formats used by conventional e-books.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
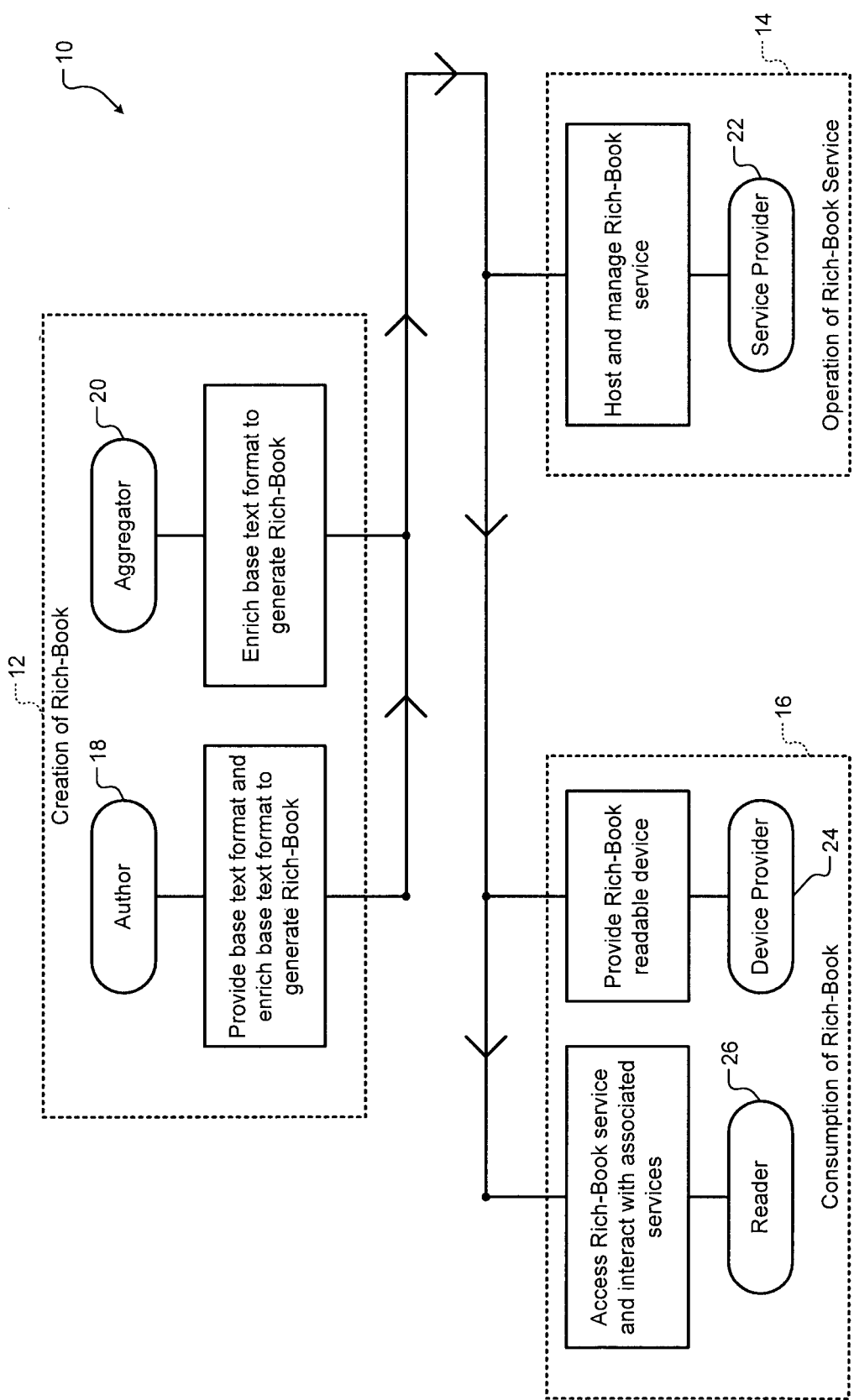
FIG. 1A is a block diagram depicting an overview of an electronic multimedia publishing system according to the present disclosure.

The following description is merely illustrative in nature and is in no way intended to limit the disclosure, its application, or uses. For purposes of clarity, the same reference numbers will be used in the drawings to identify similar elements. As used herein, the term system may refer to, be part of, or include one or more computers, which may include servers, laptop computers, and personal computers (PCs), that are interconnected via one or more networks. As used herein, the term module may refer to, be part of, or include an Application Specific Integrated Circuit (ASIC); an electronic circuit; a combinational logic circuit; a field programmable gate array (FPGA); a processor that executes code; other suitable hardware components that provide the described functionality; or a combination of some or all of the above, such as in a system-on-chip. The term module may include memory that stores code executed by the processor. The term code, as used above, may include software, firmware, and/or microcode, and may refer to programs, routines, functions, classes, and/or objects. It should be understood that steps within a method may be executed in different order without altering the principles of the present disclosure.

The apparatuses, systems, and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure relates to an electronic multimedia publishing system comprising an authoring system, a service provider system, and a remote computing device. The authoring system generates enhanced electronic books, where each enhanced electronic book (hereinafter referred to as "the Rich-Book") can include multimedia content and interactive services as explained below. The service provider system provides the interactive services for the Rich-Book, adapts the Rich-Book depending on an operational environment of the Rich-Book, and interfaces the Rich-Book to third-party services as explained below. The remote computing device renders the Rich-Book on a hardware platform and manages interactions of the hardware platform with the authoring system, the service provider system, and a user and environment of the remote computing device as explained below.

The authoring system and the service provider system can be implemented by one or more computers, which can include servers, laptop computers, and personal computers (PCs) that are interconnected via one or more networks. The remote computing device can include a personal digital assistant (PDA), a mobile computing device such as a smartphone, a network device (wireless or wired), a handheld computing device, a tablet, a laptop, a tablet, a PC, a server, or a kiosk.

Figure 1B:
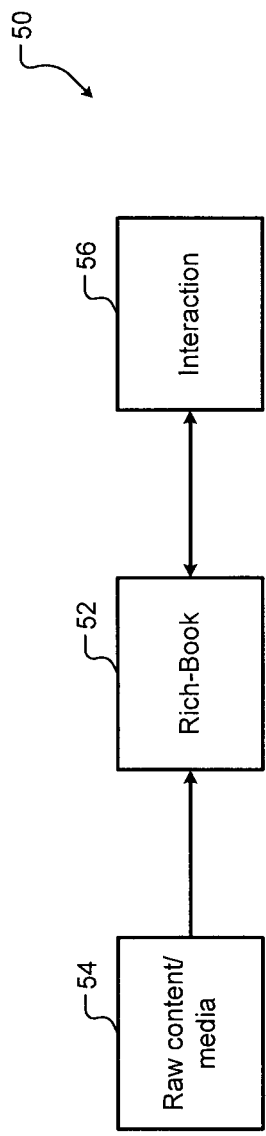
FIG. 1B depicts an information flow in the electronic multimedia publishing system of FIG. 1A.

The present disclosure is organized as follows. In FIGS. 1A and 1B, an overview of an electronic multimedia publishing system according to the present disclosure is presented. In FIGS. 2-5, the electronic multimedia publishing system and its subsystems are described in detail. In FIGS. 6A-6D, examples of functions that can be performed using a travel book are discussed in detail. In FIGS. 7A-7D, methods for generating, validating, servicing, and rendering a Rich-Book (e.g., a travel book) are described in detail.

Currently, electronic books or E-books are published in a variety of file formats. For example, Adobe PDF and ePub are most commonly used eBook file formats. PDF is an open standard for document exchange. Each PDF file encapsulates a complete description of a fixed-layout flat document including text, font, and graphics. The PDF file displays on a screen exactly as laid out by a designer. On the other hand, ePub is an extension of an XML format for reflowable digital books and publications. In ePub, the text adapts and is redrawn to a user device, and the user can control the text size.

Most current file formats and associated publishing systems are mainly designed and utilized for text-oriented e-book content. As new hardware devices are developed, which can support advanced multimedia content (e.g. audio and video data, interactive graphics, etc.), a richer form of e-book can be implemented according to the present disclosure. The richer form of e-book is not limited to just text but integrates advanced form of media data as explained below. In addition, as new hardware devices become more connected (e.g., using mobile networks or WiFi) and provide advanced features such as GPS, etc., the content of the e-books can be updated and adapted to a variety of parameters, thereby making e-books dynamic in the way e-books are consumed. The availability of applications as a way to distribute and monetize services (e.g., the Apple application store, or the Google Android store); makes a paradigm shift in the way e-books can be consumed (from a static file to a fully dynamic application). These applications provide environments based on which rich multimedia electronic publishing ecosystems disclosure can be built.

An example of such an advanced e-book is a travel book, which is explained below in detail. The travel book can include audio narration, video, augmented realities, etc. related to a tourist site. The travel book can significantly enhance a user's understanding and experience of the tourist site. The travel book can be further enhanced with additional services for making restaurant and travel reservations, advertising events local to the tourist site, etc., thereby creating an ecosystem of value-added services that can be monetized to the user. Additionally, the user can also contribute and extend the travel book experience by publishing data gathered by the user through the travel book. For example, the data gathered by the user can include photos taken at the tourist site, comments made by the user about the tourist site, etc. Such data can be saved locally on the remote computing device or on a network. Such data can be eventually shared with a social network of friends or of other readers of the travel book who are or will be visiting the tourist site and who can benefit from the knowledge, information, and insight shared by the user about the tourist site.

Throughout the present disclosure, the travel book is used for example only. Other examples of the advanced e-book according to the present disclosure include, but are not limited to, an e-learning book, an on-device tutorial book, an interactive cooking book, a troubleshooting book, and a game-playing book. For example, the e-learning book may include audio/video material related to schoolbooks for interactive learning. The on-device tutorial book may include an instruction manual for a device and may provide an interactive navigation system allowing search/retrieval of a part of a tutorial for the device. The interactive cooking book may include audio narration and a video lecture for a recipe and may allow search/retrieval of a part of the recipe. The troubleshooting book may include step-by-step audio/video instructions for troubleshooting an apparatus. The game playing book may include a storybook with animation, audio/video, and an associated application such as a quiz or a game.

Additional content and services may become available in the e-book publishing ecosystems to users, which may create added value for the users and unveil further revenue-earning possibilities in the digital environment. To support the additional content and services and to remedy deficiencies in current e-book formats and publishing systems, the present disclosure introduces an innovative electronic multimedia publishing system and associated e-book format called Rich-Book, which are described below.

Referring now to FIGS. 1A and 1B, an overview of an electronic multimedia publishing system 10 according to the present disclosure is presented. The system 10 is described in detail later. In FIG. 1A, the system 10 includes three subsystems: a subsystem 12 for creation of Rich-Book, a subsystem 14 for operation of a Rich-Book service, and a subsystem 16 for consumption of the Rich-Book. The subsystem 12 includes an author 18 and an aggregator 20. The author 18 provides content in a base text format and enriches the base text format to generate a Rich-Book. The aggregator 20 also enriches the base text format to generate the Rich-Book. The subsystem 14 includes a service provider 22 that hosts and manages the Rich-Book service. The subsystem 16 includes a device provider 24 and a reader 26. The device provider 24 provides a Rich-Book readable device. Using the device, the reader 26 can access the Rich-Book service and interact with associated services.

In FIG. 1B, an information flow 50 in the system 10 is shown. For example, a Rich-Book 52 is developed from raw content/media 54. The Rich-Book 52 can be distributed to a remote computing device directly or through the service provider 22 as explained below in detail. The reader 26 can perform an interaction 56 with the Rich-Book 52 and the service provider 22 using the remote computing device.

In general, the Rich-Book service uses a Rich-Book format according to the present disclosure, which provides media-rich content, interactivity, and associative services, and which distinguishes the Rich-Book service from existing e-books. The media-rich content may include audio/music associated with text, video/graphics integrated with text, keywords with hyperlinks, multimedia markup annotation, etc. The interactive functions may include translating language of text, associating with a dictionary, interactively navigating a map, zooming in/out of content, navigating step-by-step, augmenting reality, etc. The associative services may include providing access to a bookstore with ability to search and buy books, sharing information through social networking services (SNS), dynamic advertising, cross-marketing of goods associated with content, etc.

Accordingly, as explained below in detail, the Rich-Book format disclosed herein differs from the conventional e-book formats. Specifically, the Rich-Book format integrates a wider range of media type than the conventional e-book. The Rich-Book format allows integration of the media and text manually or using a template. The Rich-Book format allows users to interact with the media in various ways depending on the content. The Rich-Book format allows third-party applications to be associated with the content. The Rich-Book format provides customized, personalized, and dynamic content depending on user environment and interaction. The Rich-Book format allows easy updating of the content using user-generated data. The Rich-Book format allows delivery and update of the content via various networks. The Rich-Book format allows digital rights management (DRM) based intellectual property (IP) protection. The Rich-Book format allows playback in user devices while interacting with device functionalities.

Figure 2:
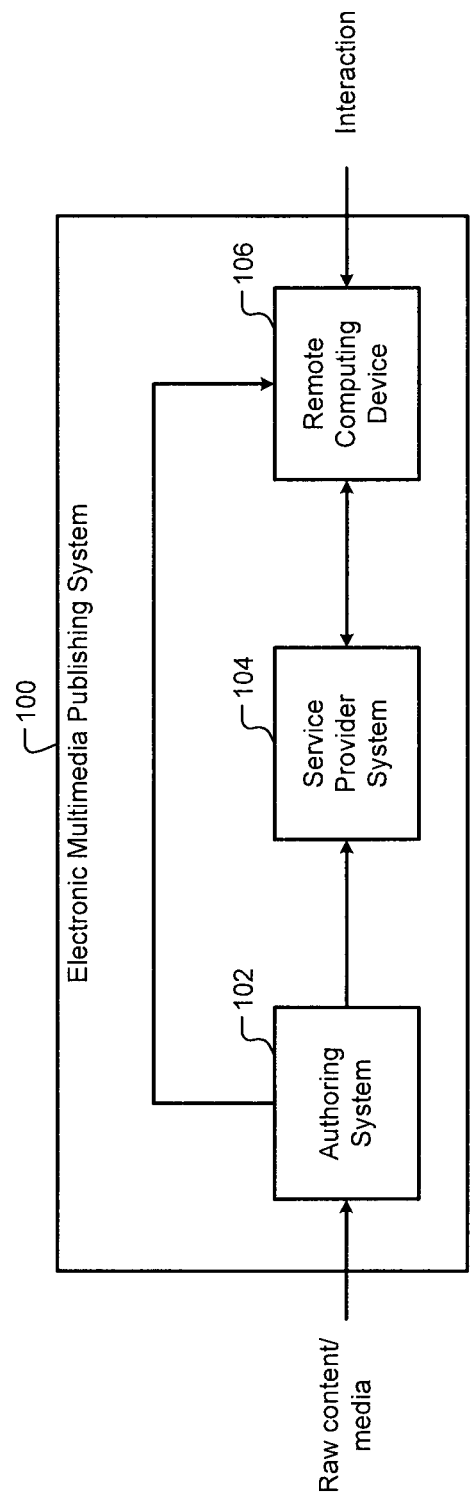
FIG. 2 is a functional block diagram of an electronic multimedia publishing system according to the present disclosure.

Referring now to FIG. 2, a functional block diagram of an electronic multimedia publishing system 100 according to the present disclosure is shown. The system 100 includes an authoring system 102, a service provider system 104, and a remote computing device 106. The authoring system 102 enables a content author (e.g., the author 18 shown in FIG. 1A) to create a Rich-Book. The authoring system 102 receives as inputs raw content and media (e.g., element 54 shown in FIG. 1B) and creates the Rich-Book from the raw content and media. For example, the authoring system 102 can receive and ingest an existing e-book and generate a Rich-Book by enhancing the text with rich media as explained below. Ingestion is a process by which content in one format (e.g., an e-book in PDF format) is transcoded into another format. For example, ingestion includes transcoding the text from an e-book so that the text can be re-used in the Rich-Book. Further, as explained below, the authoring system 102 can also emulate the Rich-Book before deploying the Rich-Book. The authoring system 102 deploys the Rich-Book directly on the remote computing device 106 or on the service provider system 104 (e.g., on a server of the service provider system 104).

The service provider system 104 runs interactive services for the Rich-Book and adapts the Rich-Book depending on utilization of the Rich-Book by a user of the remote computing device 106. The service provider system 104 can receive a request for Rich-Book service from the remote computing device 106 and can provide the Rich-Book service to the remote computing device 106 in response to the request. When the service provider system 104 provides the Rich-Book service to the remote computing device 106 in response to receiving the request from the remote computing device 106, the service provider system 104 is said to operate in a pull mode. Alternatively, the service provider system 104 can also initiate delivery of the Rich-Book service to the remote computing device 106 without receiving a request from the remote computing device 106. When the service provider system 104 provides the Rich-Book service to the remote computing device 106 without receiving a request from the remote computing device 106, the service provider system 104 is said to operate in a push mode.

On receiving the Rich-Book service from the authoring system 102 or the service provider system 104, the remote computing device 106 renders the Rich-Book. Additionally, the remote computing device 106 manages interactions between the user, the functions and the environment of the remote computing device 106, and the service provider system 104 as explained below in detail.

Figure 3:
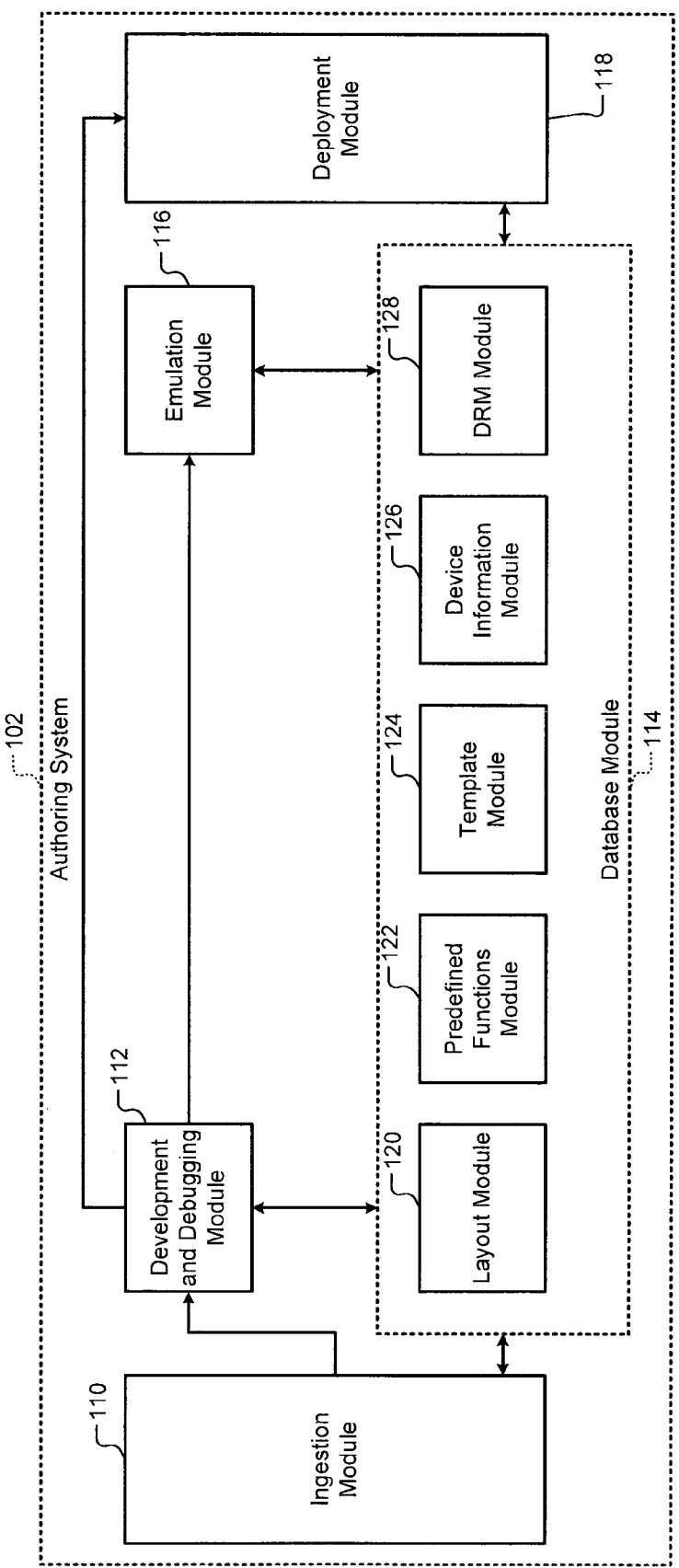
FIG. 3 is a functional block diagram of an authoring system used in the electronic multimedia publishing system of FIG. 2.

Referring now to FIG. 3, the authoring system 102 is shown in detail. The authoring system includes an ingestion module 110, a development and debugging module 112, a database module 114, an emulation module 116, and a deployment module 118. The database module 114 includes a layout module 120, a predefined functions module 122, a template module 124, a device information module 126, and a DRM module 128.

The ingestion module 110 receives and ingests raw content and media (e.g. audio, video, and graphics content) and their metadata, interactions, and interactive services. For example, the ingestion module 110 may import an existing e-book and metadata related to the existing e-book. The ingestion module 110 ingests (e.g., transcodes) the raw content and media and outputs the raw content and media to the development and debugging module 112.

The development and debugging module 112 develops a Rich-Book based on the raw content and media and develops interactive services associated with the text and media content. For example, the development and debugging module 112 adds additional media, services, and interactions to the existing e-book. The development and debugging module 112 also debugs the developed Rich-Book.

To develop the Rich-Book, the development and debugging module 112 may utilize a library of functions stored in the database module 114. For example, the database module 114 may receive as inputs layout functions, predefined functions, and templates relating to development of the Rich-Book via the ingestion module 110. The database module 114 may also receive as inputs device information (e.g., configuration and capabilities) of different remote computing devices via the ingestion module 110. The database module 114 may store the respective inputs in the layout module 120, the predefined functions module 122, the template module 124, and the device information module 126. The DRM module 128 may receive and store information related to intellectual property rights of the content received and ingested by the ingestion module 110. The DRM module 128 may generate information relating to intellectual property rights of the Rich-Book or portions thereof.

In developing the Rich-Book, the development and debugging module 112 may utilize a layout function stored in the layout module 120 to organize text and media content so that the text and media content can be automatically adapted independently of configuration and capabilities of the remote computing device 106. Instead of rewriting portions of the Rich-Book, the development and debugging module 112 may utilize predefined functions stored in the predefined functions module 122 to accelerate authoring of the Rich-Book. For example, the pre-defined functions may be related to media (e.g., a pre-defined audio-video player function), an interactivity (e.g., adaptation of Rich-book content to a location), or an interactive service (e.g., a payment function). The development and debugging module 112 may utilize a predefined template stored in the template module 124 to design the Rich-Book (e.g., a text page template, a text and video template, a text and interactive service template, etc.). The development and debugging module 112 may utilize information (e.g., configuration and capabilities) of the remote computing device 106 to design the Rich-Book that is suitable for rendering on the remote computing device 106. The development and debugging module 112 may utilize information stored in the DRM module 128 to manage and protect intellectual property rights of the Rich-Book or portions thereof.

The emulation module 116 can emulate the developed Rich-Book in a targeted consumption environment (e.g., on a targeted remote computing device) to verify consistency of the Rich-Book with the intent of the author and to verify operation of the Rich-Book in the targeted consumption environment. During emulation, the emulation module 116 can interface with the database module 114 to access the library of functions (e.g., to obtain configuration and capabilities of the targeted remote computing device, to obtain a template, etc.). For example, the emulation module 116 can emulate behavior of the Rich-Book on a selected remote computing device and on a selected service provider system to verify that the behavior is compliant with the author's intent. The selected remote computing device can be a remote computing device for which configuration and capabilities are selected by the authoring system 102. Alternatively, the selected remote computing device can be a particular remote computing device for which configuration and capabilities are available through a device database stored in the device information module 126. The selected service provider system can be emulated by the authoring system 102 or can be a fully functional service provider system (e.g., having more capabilities than the service provider system 104). When the developed Rich-Book is emulated and verified by the emulation module 116, the deployment module 118 deploys the Rich-Book either directly to the remote computing device 106 or to the service provider system 104 (or both).

Figure 4:
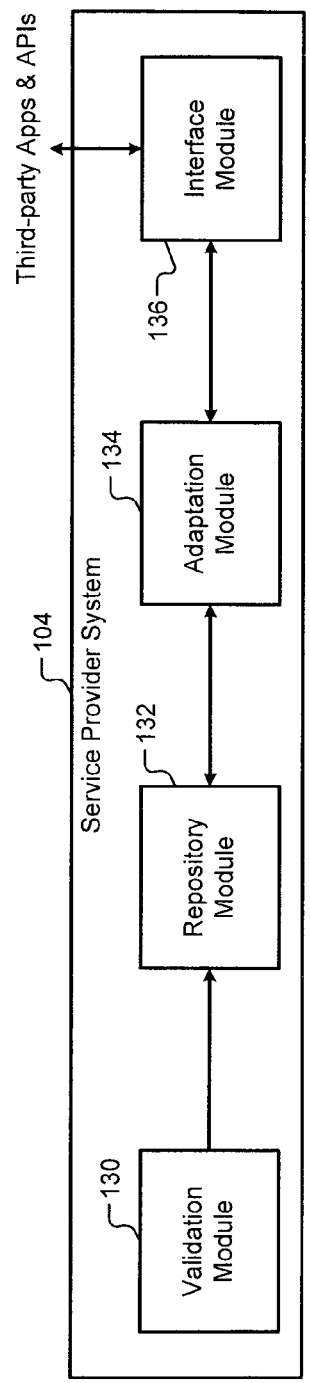
FIG. 4 is a functional block diagram of a service provider system used in the electronic multimedia publishing system of FIG. 2.

Referring now to FIG. 4, the service provider system 104 is shown in detail. For example, the service provider system 104 may be implemented by a server. The service provider system 104 includes a validation module 130, a repository module 132, an adaptation module 134, and an interface module 136. The validation module 130 validates the content of the Rich-Book for compliance with format specification (i.e. checks if format is compatible with the remote computing device 106), intellectual property rights, and other laws pertinent to hosting and distribution of the content of the Rich-Book. The repository module 132 stores and catalogues the Rich-Book when the Rich-Book is validated.

The adaptation module 134 dynamically adapts the content of the Rich-Book to different remote computing devices, network conditions (e.g. available bandwidth between the service provider system 104 and the remote computing device 106), user preferences, and intellectual property and other legal issues. Based on the remote computing device, network condition, etc., the adaptation module 134 selects a suitable Rich-Book in the repository module 132 and generates an adapted Rich-Book.

The interface module 136 interfaces the Rich-Book with APIs for services such as advertisement, localization, and payment. Additionally, the interface module 136 interfaces the Rich-Book with third-party applications such as social networking services, data archival services, etc. Further, the interface module 136 interfaces the Rich-Book with requests and interactions received from the remote computing device 106.

Figure 5:
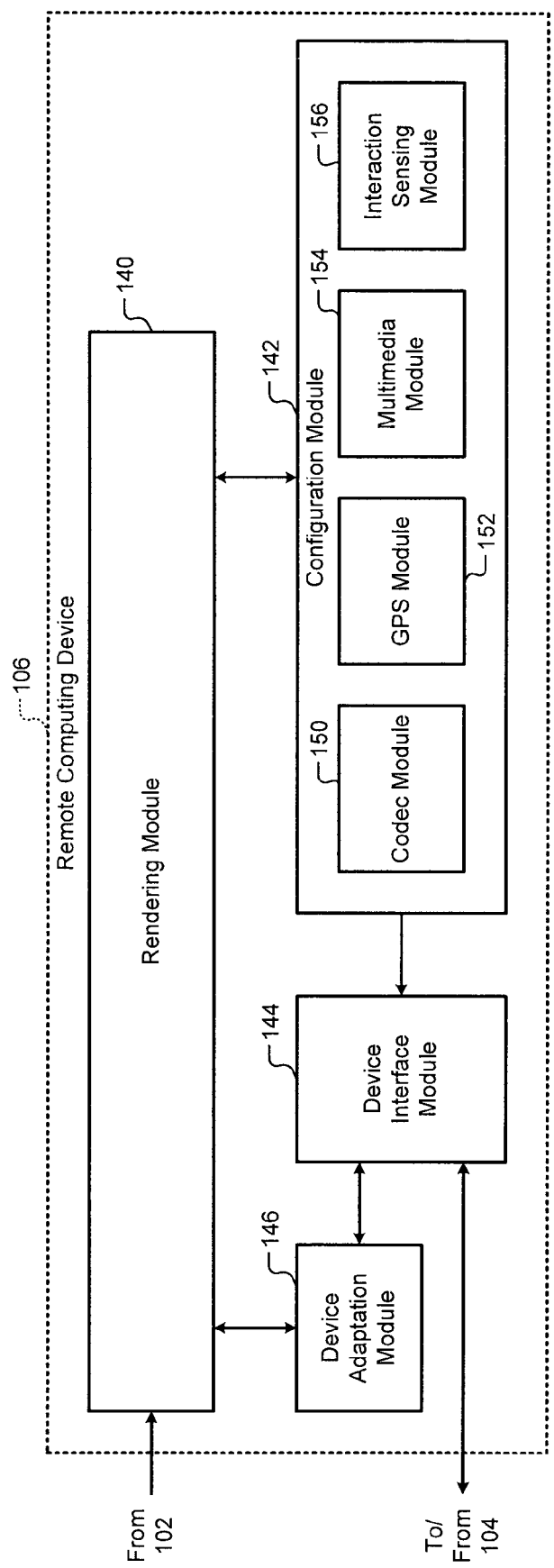
FIG. 5 is a functional block diagram of a remote computing device used in the electronic multimedia publishing system of FIG. 2.

Referring now to FIG. 5, the remote computing device 106 is shown in detail. The remote computing device 106 includes a rendering module 140, a configuration module 142, a device interface module 144, and a device adaptation module 146. The rendering module 140 renders the Rich-Book in the Rich-Book format. The rendering module 140 renders the Rich-Book in audio/video form depending on the configuration and capabilities of the remote computing device 106 retrieved from the configuration module 142.

The configuration module 142 includes several modules that determine configuration and functional capabilities of the remote computing device 106. For example, the configuration module 142 can include a codec module 150, a GPS module 152, a multimedia module 154, an interaction sensing module 156, etc. The codec module 150 determines the coding/decoding capabilities of the remote computing device 106. The GPS module 152 determines the location and tracks the movement of the remote computing device 106. The multimedia module 154 can control display, speakers, microphone, camera, etc. of the remote computing device 106.

The interaction sensing module 156 senses interactions of the user (reader) of the remote computing device 106 (e.g., through input devices such as a keypad, a touch-screen, etc.). These interactions may be called user interactions. Additionally, the interaction sensing module 156 may include sensors (e.g., light sensors, temperature sensors, compass, etc.) that sense data related to surroundings of the remote computing device 106. These data may be called environment interactions. The user interactions and the environment interactions may be collectively called interactions. In some implementations (e.g., in medical applications), the interaction sensing module 156 may further include biometric sensors that sense biometric data of the user of the remote computing device 106. The rendering module 140 interfaces with the configuration module 142 and renders the Rich-Book according to the configuration and functional capabilities of the remote computing device 106 and according to the interactions.

The device interface module 144 interfaces the remote computing device 106 with the service provider system 104. Specifically, the device interface module 144 interfaces the remote computing device 106 with the interface module 136 of the service provider system 104. The device interface module 144 provides requests and feedback from the user to the service provider system 104, where the feed-back is for services received from the service provider system 104. Additionally, the device interface module 144 communicates the configuration and functional capabilities of the remote computing device 106 and the interactions of the user and the environment of the remote computing device 106 to the interface module 136 of the service provider system 104. The adaptation module 134 of the service provider system 104 can adapt the Rich-Book according to the configuration and functional capabilities of the remote computing device 106 and the interactions.

Alternatively or additionally, the device adaptation module 146 can dynamically adapt the content of the Rich-Book based on the configuration and functional capabilities of the remote computing device 106, the interactions, and information such as updates received from the interface module 136 of the service provider system 104. For example, the device adaptation module 146 can turn a feature of the Rich-Book on or off depending on the configuration and functional capabilities of the remote computing device 106 and the interactions. This allows the authoring system 102 to generate a generic version of the Rich-Book, which can be adapted for rendering on the remote computing device 106. The adaptation can be performed by the remote computing device 106 and/or the service provider system 104 based on the configuration and functional capabilities of the remote computing device 106 and the interactions. The device interface module 144 can provide the adapted Rich-Book or portions thereof generated by the device adaptation module 146 to the service provider system 104. For example, the portions can include annotations, pictures, presence information, etc. generated by the end-user or by the remote computing device 106 based on the interactions.

Referring now to FIGS. 6A-6D, the travel book as an example of the Rich-Book according to the present disclosure is shown and described in detail. The teachings discussed herein using the travel book as an example can be applied to many other applications of Rich-Book including the examples mentioned above. The travel book according to the present disclosure provides travel information, interactive multimedia content, and associative services to the end-users. The travel book provides a comprehensive set of information, interactive data, and interactive services that assist the end-user when traveling. The electronic multimedia publishing system comprising the travel book is described below from the end-user point of view. The elements shown in FIGS. 6A-6D describe only some of the possible functionalities and should not be considered as an extended description of the Rich-Book service.

Figure 6A:
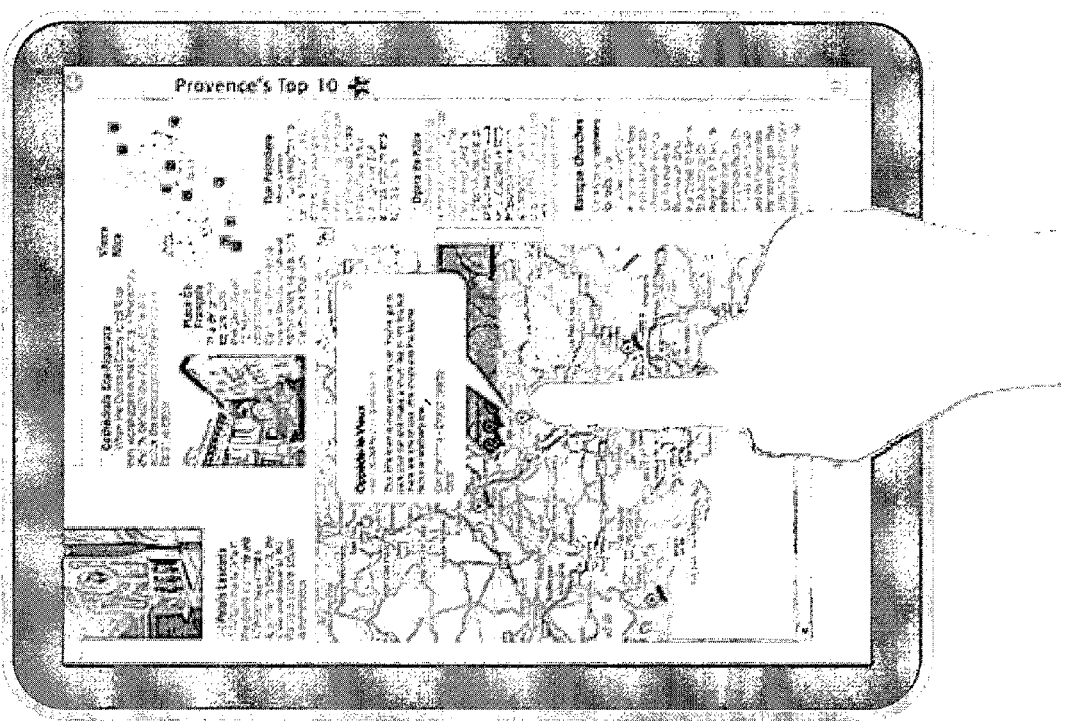
FIGS. 6A-6D depict examples of functions that can be performed using a travel book according to the present disclosure.

FIG. 6A depicts an example of how the end-user can enjoy accessing advanced multimedia information related to travel using the travel book rendered on a remote computing device such as the remote computing device 106. Based on the location of the end-user at the tourist site, the travel book opens a map of the location showing different points of interest as shown. The points of interest presented to the end-user are adapted to preferences of the end-user. The content and rendering of the travel book is adapted to the remote computing device used. The end-user can interact with the map, zoom-in and out, and select the point of interest on which the end-user desires additional information as shown. Elements that are not relevant for the remote computing device are not presented. For example, if the remote computing device does not have video support, movie content is not presented.

The travel book can be adapted for different remote computing devices. For example, when a feature phone is used as a remote computing device, a scaled-down version of the travel book can be implemented on the feature phone. When a smartphone is used as a remote computing device, an extended version of the travel book can be implemented on the smartphone. When a tablet or a PC is used as a remote computing device, a full version of the travel book can be implemented on the tablet or PC. The different versions of the travel book can be fully synchronized through the service provider system 104, thereby providing a consistent experience to the end-user.

Figure 6B:
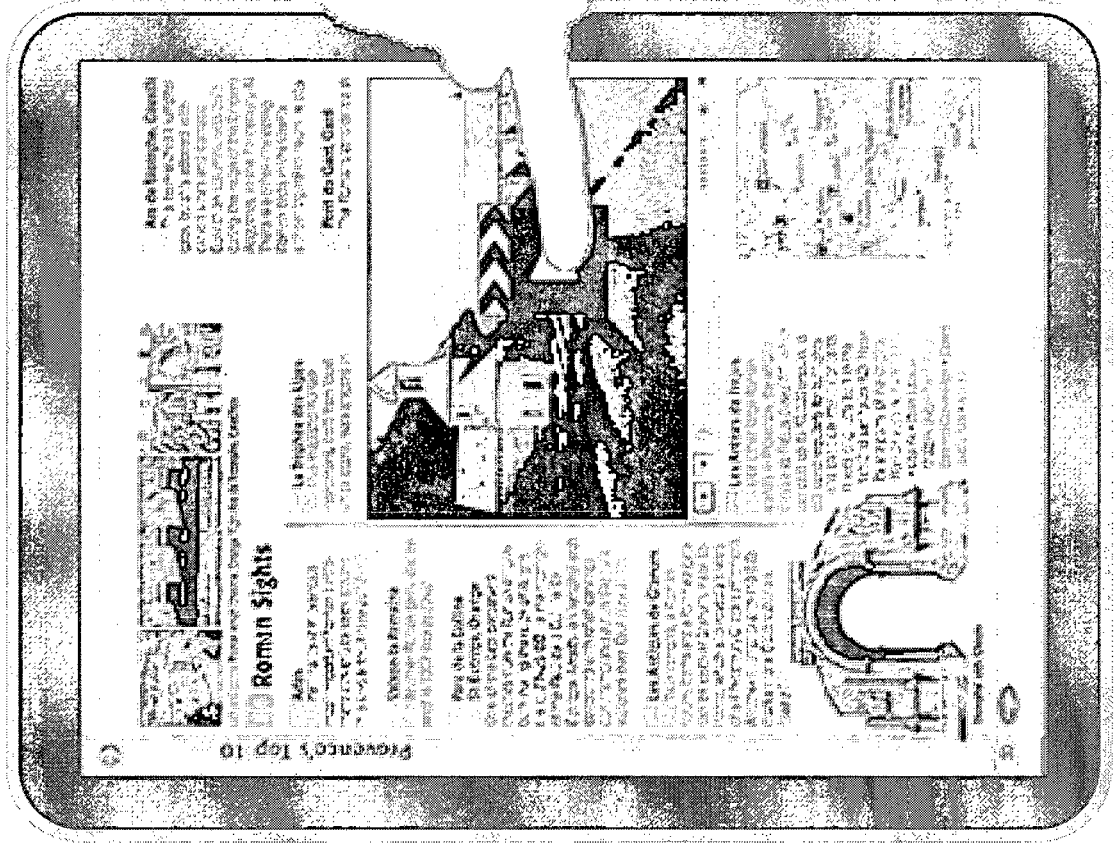

FIG. 6B depicts how the end-user can access additional information for a selected point of interest. In addition to text and images, the end-user can access movies, story-telling audio content, etc., which may be stored on the remote computing device, or which may be streamed to the remote computing device from the service provider system 104 as shown. The content of the travel book can be updated in real time to reflect updates on the point of interest. For example, the updates may include an event at the location such as a live concert or a change in opening/closing time of the point of interest, etc.

The end-user can add to the travel book any pictures, movies, audio or text comments, etc. generated by the end-user, thereby dynamically constructing a customized and personalized travel-book. The personalized content can be stored locally on the remote computing device or archived at a distant storage (e.g., a cloud-based storage) on the service provider system 104, thereby making access to the archived data ubiquitous. The service provider system 104 can provide the distant storage for free or for a fee, which may be volume-based, subscription-based, etc.

The personalized content that is part of the travel book can be presented to the end-users in different ways. For example, the personalized content can be presented by the location of the end-user on a map, chronologically depending on the time when the end-user was at the location, in the form of a slide-show, with the audio-comments that the end-user generated, and so on. The personalized content can also be stored independently of the travel book in a format that can be shared (e.g. a series of images, a movie file, and so on).

Figure 6C:
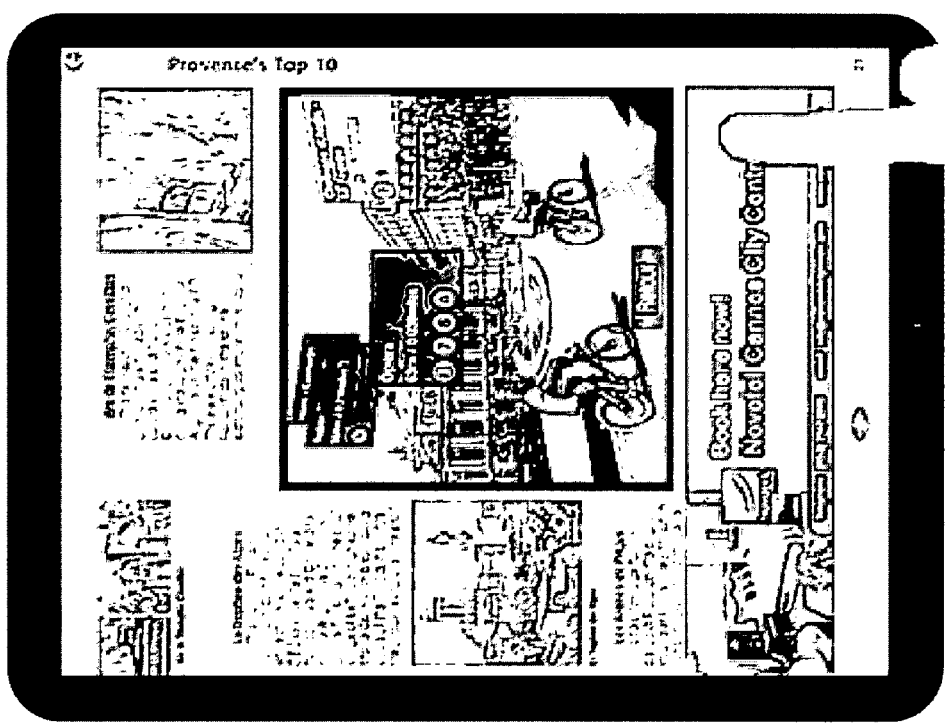

FIG. 6C depicts how, with user interaction (e.g., selecting a point of interest) and environment interaction (e.g., with a GPS and a camera), the travel book can provide additional services such as augmented reality. The end-user can capture images of the surrounding environment with the camera and dynamically get information on items being viewed through the camera. For each item, the end-user can get additional information as described in FIG. 6B.

An advertisement can be dynamically integrated with the travel book and can be customized based on the location and user preferences. The advertisement can be integrated with the travel book in the form of banners, video clips, etc. as well as directly in an augmented reality window. The advertisement can be made locally available in the travel book, can be dynamically updated from the service provider system 104, or can be dynamically updated from a third-party advertising platform.

The travel book can be dynamically updated from the service provider system 104 over time, thereby increasing the completeness of the travel book. For example, the end-user can initially retrieve for free a simple version of the travel book including basic information. Subsequently, based on travel, the end-user can acquire from the service provider system 104 for a fee an incremental update for the travel book for areas in which the end-user has an interest. The access of the end-user to the basic travel book and the additional content can be controlled using digital right management.

The end-user can access travel books cataloged at the service provider system 104 using the travel book or a standard web-site and purchase/download additional travel books. The travel books can also be acquired directly from bookstores such as Amazon, application stores such as iTunes, Android market, etc. The travel books can also be provisioned directly on remote computing devices. For example, the tourist location can provide a link to download travel books directly on the remote computing devices through SMS push, USB keys, WiFi link, etc.

In addition, the end-user can access additional services for free or for a fee. For example, the additional services can include booking a hotel room, buying tickets for a live concert or for transportation (train/bus/plane, etc.), checking time for guided tours, etc. These additional services can be provided by an ecosystem of providers that are partners of the service provider system 104. The service provider system 104 can provide different ways for making payments such as an e-wallet, credit card, etc.

Figure 6D:

FIG. 6D depicts how the end-users can connect the travel book with social networking services such as Facebook or Twitter. The end-user can, for example, directly share information regarding the journey on social networking services by directly uploading multimedia content such as text (e.g. "enjoying my day in Provence!"), pictures, audio/movies, etc. The end-user can also send information such as like/dislike about places traveled. The communication with the social networking site can be manual or automated.

The end-user can decide to make physical presence of the end-user at the tourist location visible to other users of the travel book or to the social network (e.g., using an "On-site" button on the travel book). The end-user can decide to make his presence/personal information visible to other visitors touring the location (e.g. by posting "We are a group of Korean folks and are looking for nice Korean restaurant in the area."). Thus, the travel book can generate a social network of travelers.

The end-user can share information/content with the service provider system 104, which may use the information/content to update the travel book (e.g., by pushing information about an attraction running at the tourist location, an accident at the tourist location, updating the tourist location information with daily news with pictures/movies, an expert view, etc.). The service provider system 104 can reward the end-users for such contributions to the travel book with direct money compensation (e.g., selling pictures, etc.) or indirect monetization (e.g., coupons, access to additional travel books, etc.). The service provider system 104 can also propose additional services to the end-users such as group discounts for travelers touring the same location, promotional services for restaurants, museums, etc.

The end-user can interactively enhance the travel book with annotation. Annotation can be in the form of text, recorded audio content, movies, hand-written text, etc. The annotations can be stored locally on the remote computing device 106. The annotations can also be transferred and stored on service provider system 104. The end-user may decide to make the annotations visible to other end-users, to a sub-set of end-users, or to keep them private only for personal use of the end-user.

Additionally, the annotations (e.g., text or media) can be extracted from the travel book and stored in a file with a format different than the Rich-Book format so that the file can be exported to other applications unrelated to the travel book that run on devices other than the remote computing device 106. For example, pictures taken using the travel book can be extracted from the travel book and stored in a file having a format that allows the pictures to be exported from the remote computing device 106 to a photo-album that can be viewed and shared with family privately on a PC. The device interface module 144 of the remote computing device 106 can include a suitable interface (e.g., a USB port), which allows the remote computing device 106 to interface with other devices (e.g., a PC, a flash drive, etc.), and which allows the file to be exported to the other devices.

The current ways to get travel information while traveling include using either a paper book or web searching. Compared to a paper book, the travel book according to the present disclosure provides the following advantages. The travel book is easy to carry. The travel book can be dynamically updated based on the user/environment status and is therefore always up-to-date. The travel book presents a wealth of additional dynamic services. Compared to web searching, the travel book provides the following advantages. The travel book is provided by a reliable and trusted source. The travel book provides information in a structured manner like standard books do. The travel book can be accessed even without network connection.

Referring now to FIGS. 7A-7D, methods for creating, validating, servicing, and rendering a Rich-Book (e.g., a travel book) according to the present disclosure are shown. The electronic multimedia publishing system comprising the travel book is described below from the point of view of the electronic multimedia publishing system. The elements shown in the flowcharts describe only some of the possible functionalities and should not be considered as an extended description of the Rich-Book service.

Figure 7A:
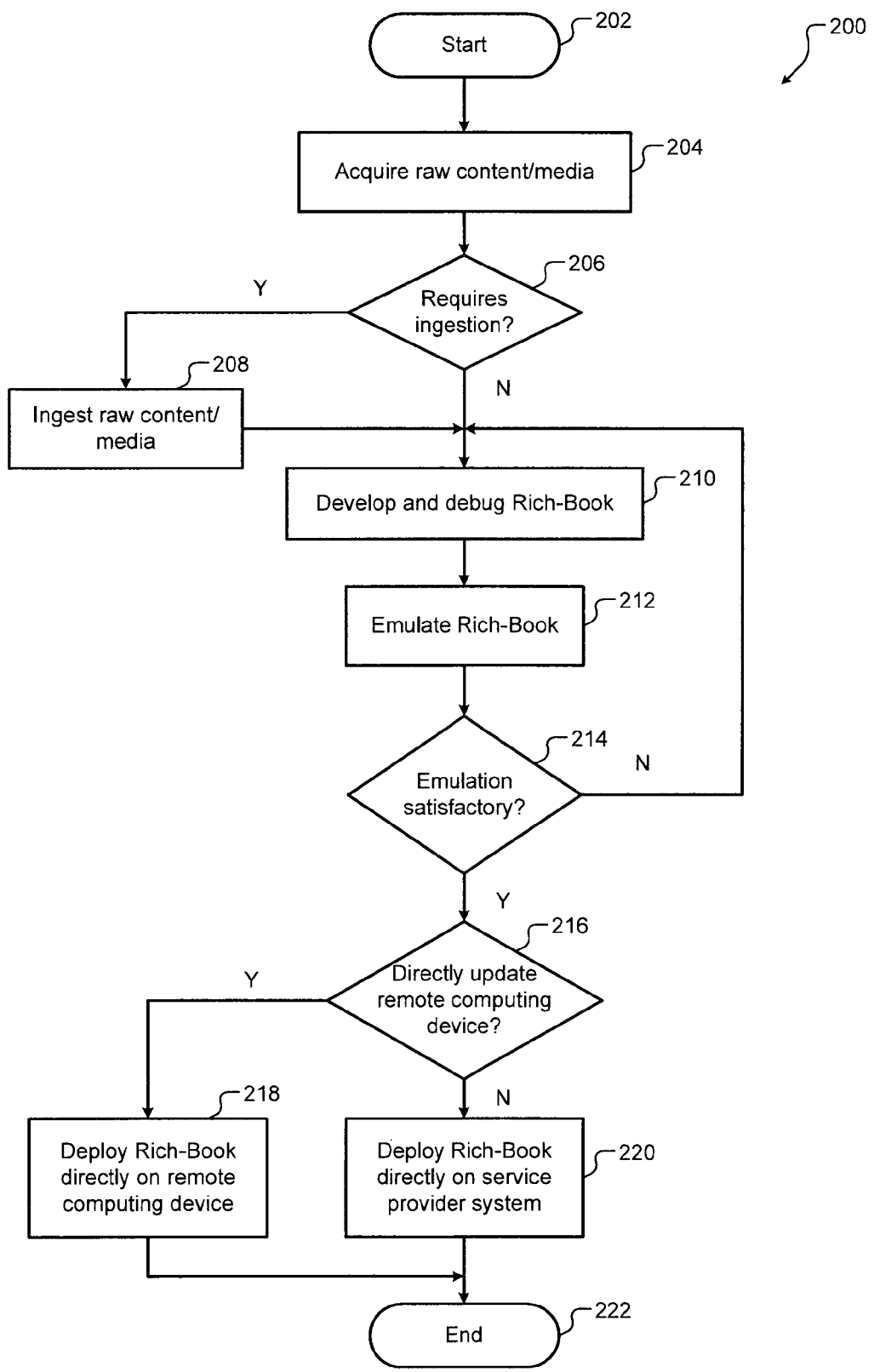
FIGS. 7A-7D are flowcharts of methods for generating, validating, servicing, and rendering a Rich-Book (e.g., a travel book) according to the present disclosure.

In FIG. 7A, a method 200 for creating and deploying a travel book is shown. The method 200 can be implemented using a software program running on a PC, Apple, Tablet, or any other type of computing device. The method 200 can be a standalone application, or the method 200 can be a plug-in of an existing development framework or a multimedia publishing system such as Eclipse, Adobe multimedia publishing systems, etc.

Control beings at 202. At 204, control acquires raw content/media from which to create the travel book. At 206, control determines whether ingestion of the raw content/media is necessary. At 208, control ingests the raw content/media if ingestion of the raw content/media is necessary. For example, control can ingest existing elements, either as individual elements (e.g., images, audio, video), or as existing composite elements (e.g., an e-book composed of text and metadata), and transform these elements from their native format into a format that can be further exploited in the creation of the travel book. One type of ingestion is to ingest existing eBook formats such PDF, ePub, HTML, etc. If an element does not require ingestion (e.g., JPEG images, raw Audio and Video content, raw text, etc.), the element can be directly used in to create the travel book.

At 210, control develops and debugs the travel book. The development may require editing and using layouts (e.g., how items on a page of the travel book are organized in space), using templates (e.g., pre-defined organization of a page of the travel book with interactive maps, a page of text with images, a form connected to a Web Service, etc.), as well as components (e.g. a video player component, a social network component, a communication component, etc.). The travel book can be developed using programmatic elements (e.g., scripting languages and executable codes such as JavaScript, java, objective C, etc.), using declarative elements (e.g., XML based descriptions such as XHTLM5) or using a combination of both programmatic and declarative elements. The travel book can also be developed through a WYSIWYG ("What-You-See-Is-What-You-Get") only interface that does not require editing of code. The development may enable the query of device characteristics (such screen size, performances, etc.) or other environmental characteristics (such as location, temperature, user preferences, etc.) so that adaptation can be performed depending on the type of remote computing device and depending on the environment.

At 212, control emulates the travel book. For example, control can simulate the usage of the travel book on a selected type of remote computing device as well as on a selected type of environmental parameters (e.g., user interaction, network bandwidth, user preferences, etc.). At 214, control determines if the emulation is satisfactory. Control returns to 210 if the emulation is not satisfactory. Control can iterate between the emulation and the development/debugging process to perfect the travel book.

At 216, when the emulation is satisfactory, control determines how to deploy the travel book. For example, control determines whether to upload the travel book directly to the remote computing device or to the service provider system. The travel book can be output in many formats. For example, the travel book output can be output as a series of single files and associated meta-data (e.g., one application installer per target device, one Web App). The travel book output can be output as a series of files and associated meta-data, where some of files can be executed on the service provider system (e.g., like a Web App), and some of the files can be executed on the remote computing device. In some implementations, the deployment of the travel book on the service provider system can be integrated directly in the authoring system.

At 218, if the travel book is to be deployed directly to the remote computing device, control deploys the travel book directly to the remote computing device. At 220, if the travel book is to be deployed to the service provider system, control deploys the travel book to the service provider system. Control ends at 222.

Figure 7D:
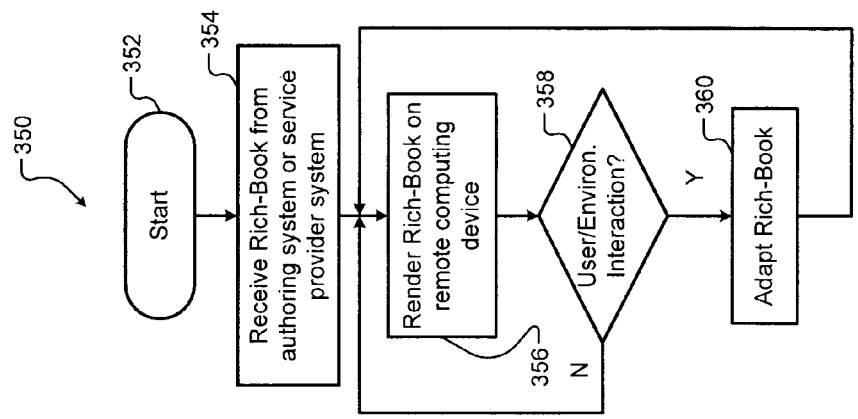
Figure 7C:
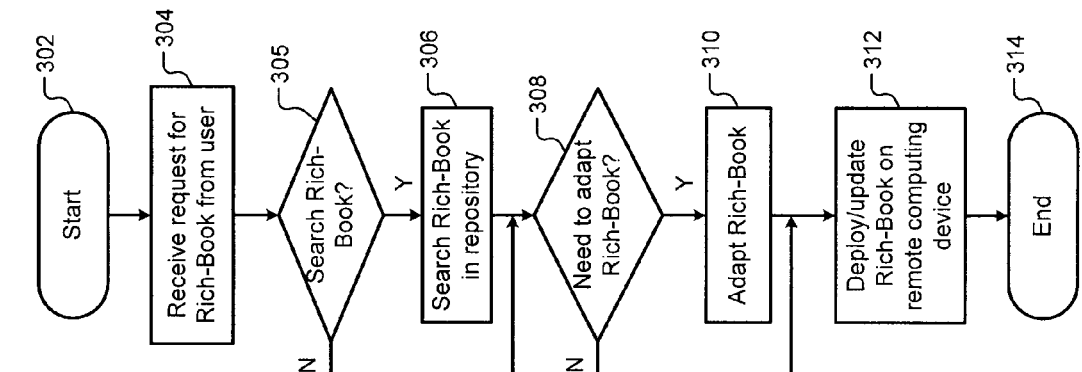
Figure 7B:
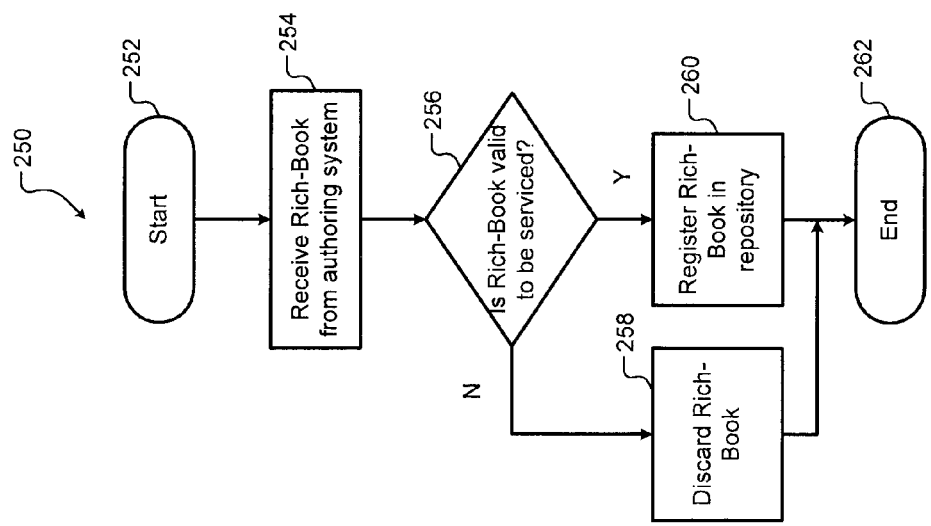

In FIG. 7B, a method 250 for validating the travel book at the service provider system is shown. The service provider system can include a server application. The server application can be a Web App or a set of Web Apps running on an application server (e.g., like IBM Websphere, Apache, or Web Logic). The server application can include a variety of interfaces, connectors, databases, etc. The service provider system can be hosted by an operator (service provider) or can be operated on the "Cloud", i.e., on a cluster of server hardware that is not physically located at the organization operating the service provider system.

Control begins at 252. At 254, control receives the travel book. At 256, control determines if the travel book received is valid. The validation can be done for multiple aspects including but not limited to the format of the travel book, the intellectual property right attached to the travel book or part thereof, the regional legal aspect depending on the geographical region where the travel book is going to be published, etc. At 258, if the travel book is not valid, the travel book may be discarded. Optionally, control may correct the travel book to make it valid if such corrections are permitted by the authoring system. At 260, if the travel book is valid, the travel book is deposited into a repository, and control ends at 260. The repository can be a standard database and include several ways to index Rich-Books such as the travel book so that the Rich-Books can be searched by author, by title, etc. The repository can be filtered (e.g. filtering by genre, by categories, by price, etc. and enables various interfaces depending on further usage.

In FIG. 7C, a method 300 for adapting the travel book at the service provider system is shown. Control begins at 302. At 304, the end-user can make a request to access a travel book. The request can be for a new travel book or for an adapted/updated travel book. At 305, control determines if the request is for a new travel book requiring a search for the travel book. At 306, if the request is for a new travel book, control checks if the travel book is available in the repository of the service provider system. At 308, if the request is not for a new travel book, control determines if the travel book needs to be updated. At 310, if the travel book needs to be updated, control updates the travel book. At 312, control deploys/updates travel book on the remote computing device, and control ends at 314.

For example, such request can come from a Web site monetizing the travel book (e.g., Amazon bookstore) or from an application store (e.g., Apple iTunes, Android Market, etc.). Alternatively, the request can come from an existing travel book providing the service to purchase other travel books (e.g., the user may have acquired a travel book for Paris and may want to extend coverage for Normandy and later on for Austria and Vienna).

Based on the end-user request, control searches the directory for the best match satisfying the end-user request (e.g., see 310). Control may repeat request-search iterations until the right travel book is found. The process can be finalized by a transaction (e.g., the end-user may purchase the travel book found, or part thereof). Once the end-user has selected the travel book to be purchased, two possibilities can arise: The travel book is available for the remote computing device of the end-user, and the travel is deployed on the remote computing device (e.g., see 312). Alternatively, the travel book is not available for the remote computing device, and the travel book is first adapted by the service provider system before the travel book is deployed on the remote computing device (e.g., see 310).

More generally, control may manage requests from the end-user, process the requests and eventually interface with third-party services (such as interactive services or third-party applications), adapt the travel book accordingly, deliver the adapted travel book or part thereof to the remote computing device. While FIG. 7C shows that the interaction between the remote computing device and the service provider system is initiated by remote computing device, the service provider system can also initiate the interaction (Push mode) and send an update to the travel book. For example, the Push mode can be used to proposed promotions, update the travel book information, etc.

In FIG. 7D, a method 350 for rendering the travel book on the remote computing device is shown. Control begins at 352. At 354, control receives the travel book at the remote computing device of the end-user directly from the authoring system (e.g., a travel book file is downloaded to the remote computing device) or through the service provider system (either in its entirety, or in the form of updates/upgrades). The remote computing device can be running a software application on a generic hardware device such as a PC, a table, or a Smartphone. Alternatively, the remote computing device can be running a software application on a hardware dedicated for rendering the travel book, such as Amazon Kindle.

At 356, control renders the travel book on the remote computing device and presents to the end-user various elements of the content of the travel book. At 358, control determines if there is user/environment interaction. Control returns to 356 if there is no user/environment interaction. Although there is no user/environment interaction, the content of the travel book can be dynamic (interactive) based on the internal logic of the travel book. For example, the end-user can interactively play an animation when the travel book is open, check-updates on the service provider system, etc. While rendering the travel book, the remote computing device can interact with various functions of the remote computing device such as GPS, camera, audio/video player, etc. The end-user can interactively engage in travel book interactions, which can be generated by the environment around the travel book (e.g., SMS event, localization event, etc.).

At 360, based on the interactions, control adapts the travel book and presents the updated/adapted travel book to the end-user on the remote computing device for further interaction. Control may adapt/update the travel book differently based on type of interaction. For some type of interaction (e.g., adaptation based on the GPS information), control can adapt the travel book locally at the remote computing device without external communication. For some type of interaction (e.g., request to a third-party service, billing transaction etc.), control may update/adapt the travel book by interfacing the remote computing device with the service provider system (e.g., via communication protocols such as HTTP, HTTPS, TCP/IP, RTP/UDP/IP, SSID, SMS, etc.). For some type of interaction (e.g. if the end-user purchases an additional volume of the travel book), control may receive an update for the travel book from the service provider system, and so on.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An electronic multimedia publishing system comprising:
   an authoring system that creates an enhanced electronic book comprising text, multimedia content, and interactive services;
   a service provider system that allows execution of the interactive services, that adapts the enhanced electronic book based on usage of the enhanced electronic book by a user, and that interfaces the enhanced electronic book to a plurality of additional services; and
   a remote computing device that renders the enhanced electronic book to the user and that manages interactions between the user, the enhanced electronic book, and the service provider system using the interactive services,
   wherein the authoring system comprises an emulation module that emulates the enhanced electronic book using (i) functions of the service provider system and a configuration of the remote computing device or (ii) functions of a fully functional service provider system and a configuration of a generic remote computing device to verify consistency of the enhanced book with author intent for rendering the enhanced book on the remote computing device.

2. The electronic multimedia publishing system of claim 1, wherein the remote computing device comprises:
   a configuration module that determines the configuration of the remote computing device;
   an interaction sensing module that senses interactions between the user, the enhanced electronic book, the remote computing device, and the service provider system; and
   a rendering module that renders the enhanced electronic book to the user based on the configuration of the remote computing device and the interactions.

3. The electronic multimedia publishing system of claim 2, wherein the remote computing device further comprises an adaptation module that adapts the enhanced electronic book based on the configuration of the remote computing device and the interactions.

4. The electronic multimedia publishing system of claim 3, wherein the remote computing device provides at least a portion of the adapted enhanced electronic book to the service provider system, and wherein the service provider system allows other users to access the adapted enhanced electronic book via one of the plurality of additional services.

5. The electronic multimedia publishing system of claim 4, wherein the remote computing device extracts the portion of the adapted enhanced electronic book, stores the portion of the adapted enhanced electronic book in a format different than the enhanced electronic book, and exports the portion of the adapted enhanced electronic book from the remote computing device to another device.

6. The electronic multimedia publishing system of claim 1, wherein the authoring system comprises a deployment module that deploys the enhanced electronic book on the service provider system or directly on the remote computing device when the emulation of the enhanced electronic book is successful.

7. The electronic multimedia publishing system of claim 1, wherein the service provider system comprises a validation module that determines whether (i) the enhanced electronic book has a format compatible with configuration of the remote computing device, (ii) intellectual property rights associated with the enhanced electronic book are valid, and (iii) content of the enhanced electronic book is legal.

8. The electronic multimedia publishing system of claim 7, wherein the service provider system further comprises a repository module that stores the enhanced electronic book when validation of the enhanced electronic book is successful.

9. The electronic multimedia publishing system of claim 1, wherein the remote computing device comprises an adaptation module that adapts the enhanced electronic book based on location data and environmental data associated with the remote computing device.

10. The electronic multimedia publishing system of claim 1, wherein the remote computing device receives the enhanced electronic book directly from the authoring system or from the service provider system.

11. The electronic multimedia publishing system of claim 1, wherein the remote computing device directly interacts with one of the plurality of additional services without accessing the one of the plurality of additional services via the service provider system.

12. The electronic multimedia publishing system of claim 1, wherein the authoring system comprises:
   an ingestion module that ingests first data and that generates second data, wherein the first data includes raw content and media to be included in the enhanced electronic book, wherein ingesting the first data includes transcoding the first data, and wherein the second data includes transcoded first data; and
   a development and debugging module that (a) creates the enhanced electronic book based on (i) the second data and (ii) at least one of a design layout, a predefined function, a predefined template, and the configuration of the remote computing device and (b) debugs the enhanced electronic book.

13. The electronic multimedia publishing system of claim 1, wherein the authoring system comprises a digital rights management module that associates intellectual property rights with the enhanced electronic book.

14. The electronic multimedia publishing system of claim 1, wherein the service provider system comprises an adaptation module that dynamically adapts the enhanced electronic book based on at least one of (i) usage and configuration of the remote computing device, (ii) condition of network connection between the service provider system and the remote computing device, (iii) intellectual property rights associated with the enhanced electronic book, and (iv) legality of content of the enhanced electronic book.

15. The electronic multimedia publishing system of claim 1, wherein the service provider system comprises an interface module that interfaces the enhanced electronic book and the remote computing device to the plurality of additional services and that executes the interactive services of the enhanced electronic book.

16. The electronic multimedia publishing system of claim 1, wherein the enhanced electronic book is dynamically updated on the service provider system or directly on the remote computing device.

17. The electronic multimedia publishing system of claim 1, wherein the authoring system and the service provider system each includes a server, and wherein the remote computing device includes a personal digital assistant.

18. The electronic multimedia publishing system of claim 1, wherein the plurality of additional services includes a payment service, an advertisement service, a social networking service, a navigation service, a travel service, and a promotional service.

19. An electronic multimedia publishing system comprising an authoring system to create an enhanced electronic book that is to be rendered on a remote computing device, the authoring system comprising:
   a server computer including:
      an ingestion module that ingests first data and that generates second data, wherein the first data includes raw content and media to be included in the enhanced electronic book, wherein ingesting the first data includes transcoding the first data, and wherein the second data includes transcoded first data;
      a database module that includes a database of (i) design layouts, predefined functions, and predefined templates for a plurality of electronic books and (ii) configurations of a plurality of remote computing devices capable of rendering the plurality of electronic books;
      a development module that creates the enhanced electronic book based on (i) the second data and (ii) at least one of the design layouts, the predefined functions, the predefined templates, and the configurations selected from the database; and
      an emulation module that emulates the enhanced electronic book using (i) functions of a service provider system designed to service the enhanced electronic book and a configuration of the remote computing device or (ii) functions of a fully functional service provider system and a configuration of a generic remote computing device to verify consistency of the enhanced book with author intent for rendering the enhanced book on the remote computing device.

20. The publishing system of claim 19, further comprising a deployment module that deploys the enhanced electronic book on the service provider system or directly on the remote computing device when the emulation of the enhanced electronic book is successful.

21. The publishing system of claim 19, further comprising a debugging module that debugs the enhanced electronic book.

22. The publishing system of claim 19, further comprising a digital rights management module that associates intellectual property rights with the enhanced electronic book.

23. The publishing system of claim 19, further comprising the service provider system that services the enhanced electronic book, wherein the service provider system comprises a validation module that determines whether (i) the enhanced electronic book is compatible with the configuration of the remote computing device, (ii) intellectual property rights associated with the enhanced electronic book are valid and (iii) content of the enhanced electronic book is legal.

24. The publishing system of claim 23, wherein the service provider system further comprises a repository module that stores the enhanced electronic book when validation of the enhanced electronic book is successful.

25. The publishing system of claim 24, wherein the service provider system further comprises an adaptation module that dynamically adapts the enhanced electronic book based on at least one of (i) usage and the configuration of the remote computing device, (ii) condition of network connection between the service provider system and the remote computing device, (iii) intellectual property rights associated with the enhanced the enhanced electronic book, and (iv) legality of content of the enhanced electronic book.

26. The publishing system of claim 25, wherein the adaptation module dynamically updates the enhanced electronic book on the service provider system or directly on the remote computing device.

27. The publishing system of claim 23, wherein the service provider system further comprises an interface module that interfaces the enhanced electronic book and the remote computing device to a plurality of additional services and that executes interactive services of the enhanced electronic book.

28. The publishing system of claim 23, wherein the service provider system includes a server that is different from the server computer of the publishing system.

29. The publishing system of claim 19, further comprising the remote computing device, wherein the remote computing device comprises:
   an interface module that receives the enhanced electronic book from (i) the system or (ii) the service provider system that services the enhanced electronic book; and
   a rendering module that renders the enhanced electronic book to a user on the remote computing device based on the configuration of the remote computing device.

30. The publishing system of claim 29, wherein the remote computing device further comprises an adaptation module that adapts the enhanced electronic book based on (i) the configuration of the remote computing device and (ii) interactions between the user, the remote computing device, the enhanced electronic book, and the service provider system.

31. The publishing system of claim 30, wherein the adaptation module adapts the enhanced electronic book based on location data and environmental data associated with the remote computing device.

32. The publishing system of claim 30, wherein the interface module provides at least a portion of the adapted enhanced electronic book to the service provider system, and wherein the service provider system allows other users to access the adapted enhanced electronic book.

33. The publishing system of claim 29, wherein the remote computing device further comprises:
   a configuration module that determines the configuration of the remote computing device, wherein the configuration includes a coding/decoding capability of the remote computing device, presence or absence of (i) a GPS system and (ii) a multimedia system in the remote computing device; and
   an interaction sensing module that senses interactions between the user, the remote computing device, the enhanced electronic book, and the service provider system.

34. The publishing system of claim 29, wherein the interface module interfaces the remote computing device directly with one of a plurality of services without accessing the plurality of services via the service provider system, and wherein the plurality of services includes a payment service, an advertisement service, a social networking service, a travel service, a navigation service, and a promotional service.

35. The publishing system of claim 29, wherein the remote computing device includes a personal digital assistant, a handheld device, a tablet, a wireless network device, or a kiosk.

36. A system to service enhanced electronic books comprising:
   a server computer including:
   a validation module that receives an enhanced electronic book from an authoring system and that determines whether the enhanced electronic book has a format compatible with configuration of a remote computing device designed to render the enhanced electronic book to a user;
   a repository module that stores the enhanced electronic book when validation of the enhanced electronic book is successful; and
   an adaptation module that dynamically adapts the enhanced electronic book based on (i) usage and configuration of the remote computing device, (ii) condition of network connection between the system and the remote computing device, (iii) intellectual property rights associated with the enhanced electronic book, and (iv) legality of content of the enhanced electronic book.

37. The system of claim 36, wherein the validation module determines whether (i) intellectual property rights associated with the enhanced electronic book are valid and (ii) content of the enhanced electronic book is legal.

38. The system of claim 36, wherein the adaptation module dynamically updates the enhanced electronic book on the system or directly on the remote computing device.

39. The system of claim 36, further comprising an interface module that interfaces the enhanced electronic book and the remote computing device to a plurality of additional services and that executes interactive services of the enhanced electronic book.

40. The system of claim 36, further comprising the remote computing device, wherein the remote computing device comprises:
   an interface module that receives the enhanced electronic book from (i) the authoring system or (ii) the system;
   a configuration module that determines the configuration of the remote computing device, wherein the configuration includes a coding/decoding capability of the remote computing device, presence or absence of (i) a GPS system and (i) a multimedia system in the remote computing device; and
   a rendering module that renders the enhanced electronic book to the user on the remote computing device based on the configuration of the remote computing device.

41. The system of claim 40, wherein the remote computing device further comprising an interaction sensing module that senses the interactions between the user, the remote computing device, the enhanced electronic book, and the system, wherein the rendering module renders the enhanced electronic book to the user on the remote computing device based on the interactions.

42. The system of claim 40, wherein the remote computing device further comprises a device adaptation module that adapts the enhanced electronic book based on (i) the configuration of the remote computing device and (ii) interactions between the user, the remote computing device, the enhanced electronic book, and the system.

43. The system of claim 42, wherein the interface module provides at least a portion of the adapted enhanced electronic book to the system, and wherein the system allows other users to access the adapted enhanced electronic book.

44. The system of claim 42, wherein the device adaptation module adapts the enhanced electronic book based on location data and environmental data associated with the remote computing device.

45. The system of claim 40, wherein the interface module interfaces the remote computing device directly with one of a plurality of services without accessing the plurality of services via the system, and wherein the plurality of services includes a payment service, an advertisement service, a social networking service, a travel service, a navigation service, and a promotional service.

46. The system of claim 40, wherein the remote computing device includes a personal digital assistant, a handheld device, a tablet a wireless network device, or a kiosk.

47. A mobile computing device comprising:
   a receiver that receives an enhanced electronic book from (i) an authoring system that creates the enhanced electronic book or (ii) a service provider system that services the enhanced electronic book;
   a display that renders the enhanced electronic book to a user on the mobile computing device based on configuration of the mobile computing device; and
   an adaptation module that adapts the enhanced electronic book based on (i) the configuration of the mobile computing device and (ii) interactions between the user, the mobile computing device, the enhanced electronic book, and the service provider system,
   wherein the mobile computing device extracts a portion of the adapted enhanced electronic book, stores the portion of the adapted enhanced electronic book in a format different than the enhanced electronic book, and exports the portion of the adapted enhanced electronic book from the mobile computing device to another device.

48. The mobile computing device of claim 47, wherein the mobile computing device provides at least the portion of the adapted enhanced electronic book to the service provider system, and wherein the service provider system allows other users to access the adapted enhanced electronic book.

49. The mobile computing device of claim 47, wherein the adaptation module adapts the enhanced electronic book based on location data and environmental data associated with the mobile computing device.

50. The mobile computing device of claim 47, further comprising a configuration module that determines the configuration of the mobile computing device, wherein the configuration includes a coding/decoding capability of the mobile computing device, presence or absence of (i) a GPS system and (i) a multimedia system in the mobile computing device.

51. The mobile computing device of claim 47, further comprising an interaction sensing module that senses the interactions.

52. The mobile computing device of claim 47, wherein the mobile computing device interfaces directly with one of a plurality of services without accessing the plurality of services via the service provider system, and wherein the plurality of services includes a payment service, an advertisement service, a social networking service, a travel service, a navigation service, and a promotional service.

53. The mobile computing device of claim 47, wherein the mobile computing device includes a personal digital assistant, a handheld device, a tablet, a wireless network device, or a kiosk.

54. A method for an electronic multimedia publishing system, the method comprising:
   creating an enhanced electronic book comprising text, multimedia content, and interactive services;

emulating the enhanced electronic book using (i) functions of a service provider system and configuration of a remote computing device or (ii) functions of a fully functional service provider system and configuration of a generic remote computing device to verify consistency of the enhanced book with author intent for rendering the enhanced book on the remote computing device;

executing the interactive services on the service provider system;

adapting the enhanced electronic book at the service provider system based on usage of the enhanced electronic book by a user;

interfacing the enhanced electronic book to a plurality of additional services through the service provider system;

rendering the enhanced electronic book to the user on the remote computing device; and managing interactions between the user, the enhanced electronic book, and the service provider system using the interactive services.

\* \* \* \* \*